United States Patent

Veen et al.

[11] Patent Number: 5,908,642
[45] Date of Patent: Jun. 1, 1999

[54] EXTRUSION HEAD FOR PLASTICS EXTRUDER

[75] Inventors: Hendrik Willem Veen, Ommen; Dirk Mulder, Borne, both of Netherlands

[73] Assignee: Machinefabriek "De Rollepaal" b.v., Dedemsvaart, Netherlands

[21] Appl. No.: 08/913,330

[22] PCT Filed: Mar. 9, 1996

[86] PCT No.: PCT/EP96/01017

§ 371 Date: Sep. 12, 1997

§ 102(e) Date: Sep. 12, 1997

[87] PCT Pub. No.: WO96/28294

PCT Pub. Date: Sep. 19, 1996

[30] Foreign Application Priority Data

Mar. 15, 1995 [DE] Germany ............... 195 09 375

[51] Int. Cl.⁶ ............... B29C 47/20; B29C 47/22
[52] U.S. Cl. ............... 425/183; 425/186; 425/192 R; 425/466; 425/467
[58] Field of Search ............... 425/183, 186, 425/190, 192 R, 461, 466, 467

[56] References Cited

U.S. PATENT DOCUMENTS

| | | | |
|---|---|---|---|
| 3,321,805 | 5/1967 | Given | 425/192 R |
| 3,570,062 | 3/1971 | Dukert | 425/192 R |
| 3,676,535 | 7/1972 | Juel | 425/192 R |
| 3,833,247 | 9/1974 | Puskas | 425/197 |
| 5,124,096 | 6/1992 | Brambilla | 425/192 R |
| 5,125,698 | 6/1992 | Altimus | 425/192 R |
| 5,221,541 | 6/1993 | Arbour et al. | 425/199 |
| 5,388,977 | 2/1995 | Shirakawa | 425/192 R |
| 5,518,036 | 5/1996 | DeMasters et al. | 425/467 |

FOREIGN PATENT DOCUMENTS

| | | |
|---|---|---|
| 2039735 | 2/1971 | Germany . |
| 2941260 | 5/1981 | Germany . |

*Primary Examiner*—Khanh P Nguyen
*Attorney, Agent, or Firm*—Jordan and Hamburg

[57] ABSTRACT

The extrusion head for plastics extruders includes a die head, which is disposed axially in the extrusion direction downstream from a jaw plate. The die head is divided in an at least approximately radial direction into a main part and an orifice part and the cones of the orifice part can be fixed independently of one another at the respectively adjacent cones of the main part and exchanged for other cones in a rapid operation.

21 Claims, 4 Drawing Sheets

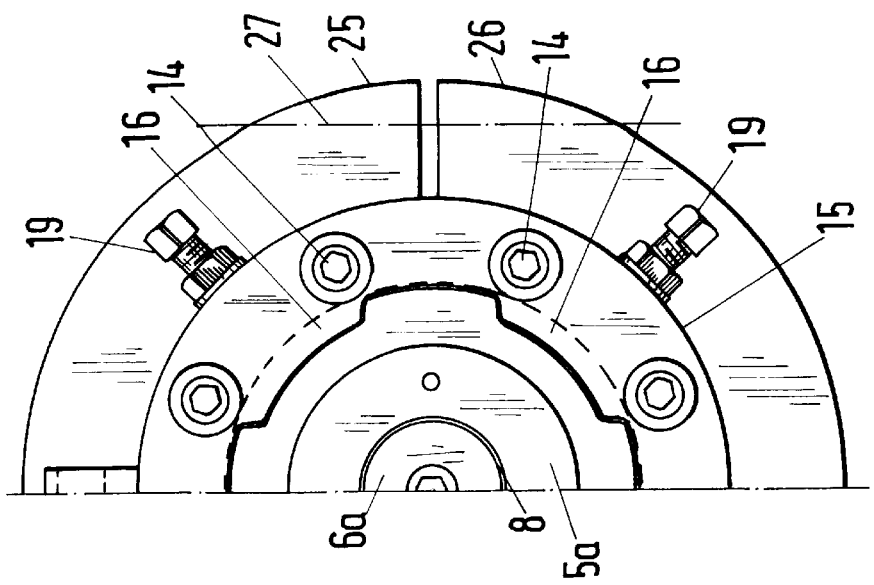
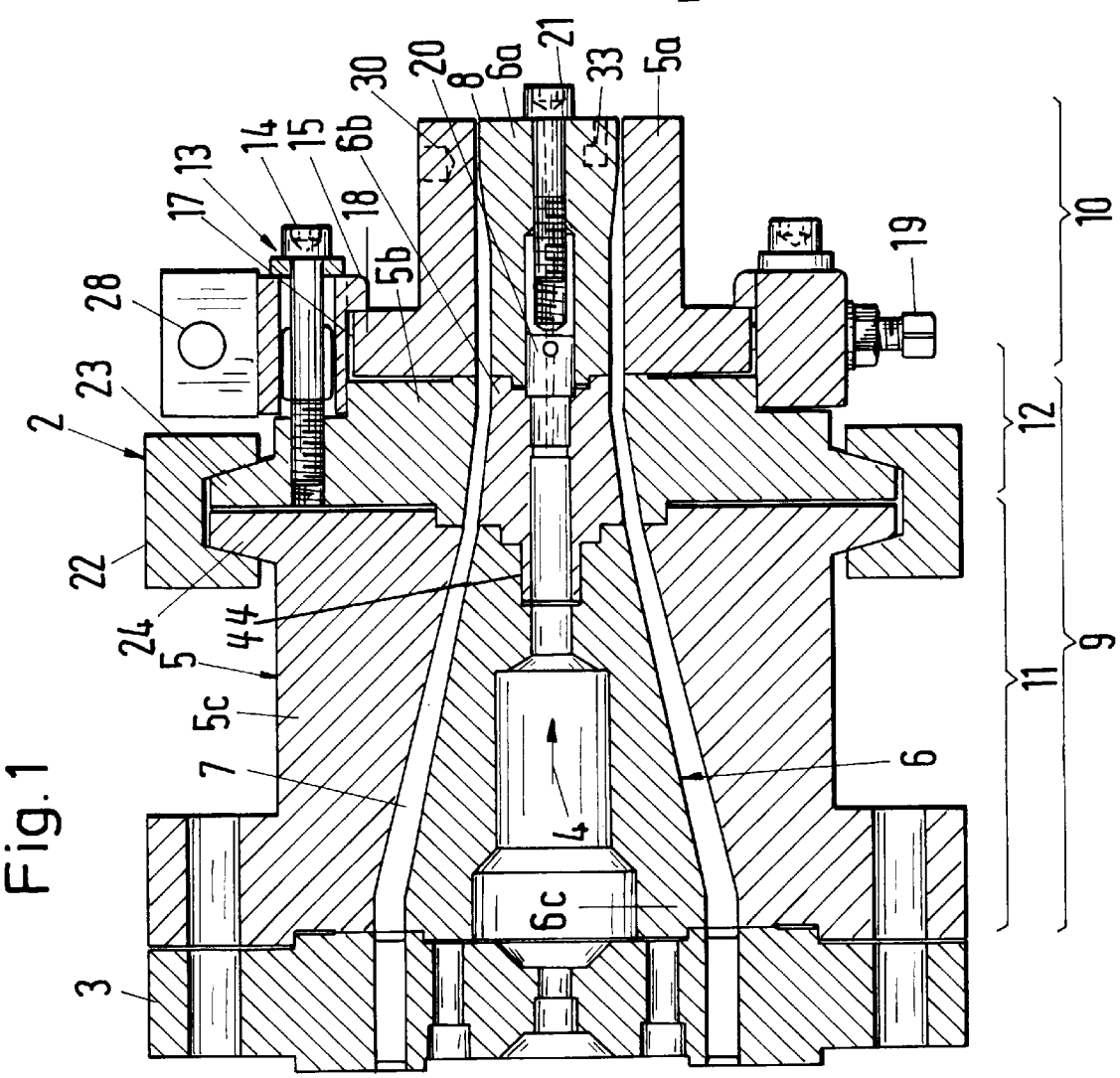

EXTRUSION HEAD FOR PLASTICS EXTRUDER

BACKGROUND OF THE INVENTION

The invention relates to an extrusion head for plastics extruders with a die head, which is disposed axially in the extrusion direction downstream from a jaw plate and formed by an outer cone and an inner cone.

If after a product is extruded, the plastics extruder is to be used for the extrusion of a different product, particularly one having different dimensions, it is necessary to change either the entire extrusion head, which is extremely heavy and difficult to handle, or at least the die head of the extrusion head. In both cases, a considerable effort is involved and the extruder generally has to be stopped for several hours. In order to avoid that the plastic material, which is in the extruder and was used for the preceding production, solidifies and clogs the units of the extruder in contact with the plastic material and even makes them inoperable, the extruder, before the actual exchanging process, must be operated with a special plastics composition, which is not flammable, does not degrade and cannot solidify and, in addition, has advantageous heating and thermal conductivity properties.

SUMMARY OF THE INVENTION

It is an object of the invention to provide an extrusion head, which can be installed quickly and with little effort for extruding a different product.

The inventive extrusion head makes it possible to retool for extruding a different product in an exceptionally short time, so that it is not necessary to use a special plastic material in preparation for the exchanging work. The retooling or installing process is exceptionally simple and dispenses with the necessity to handle heavy parts. Since the orifice part has only a relatively low mass, it can be brought to the operating temperature quickly and with little expenditure of energy. The work of preparing the orifice part removed for later re-use is also relatively slight.

Numerous further details and advantages arise out of the following description and the drawing, in which an example of the object of the invention is shown in greater detail in the accompanying drawings.

FIG. 1 shows an axial section illustrating the jaw plate and the die head of the inventive extrusion head, FIG. 2 shows half of a front view corresponding to FIG. 1, FIGS. 3 and 4 show representations, similar to that of FIG. 1, of a modified version, and FIG. 5 shows a side view of accessory equipment for exchanging.

DESCRIPTION OF THE PREFERRED EMBODIMENTS

Figure 5:
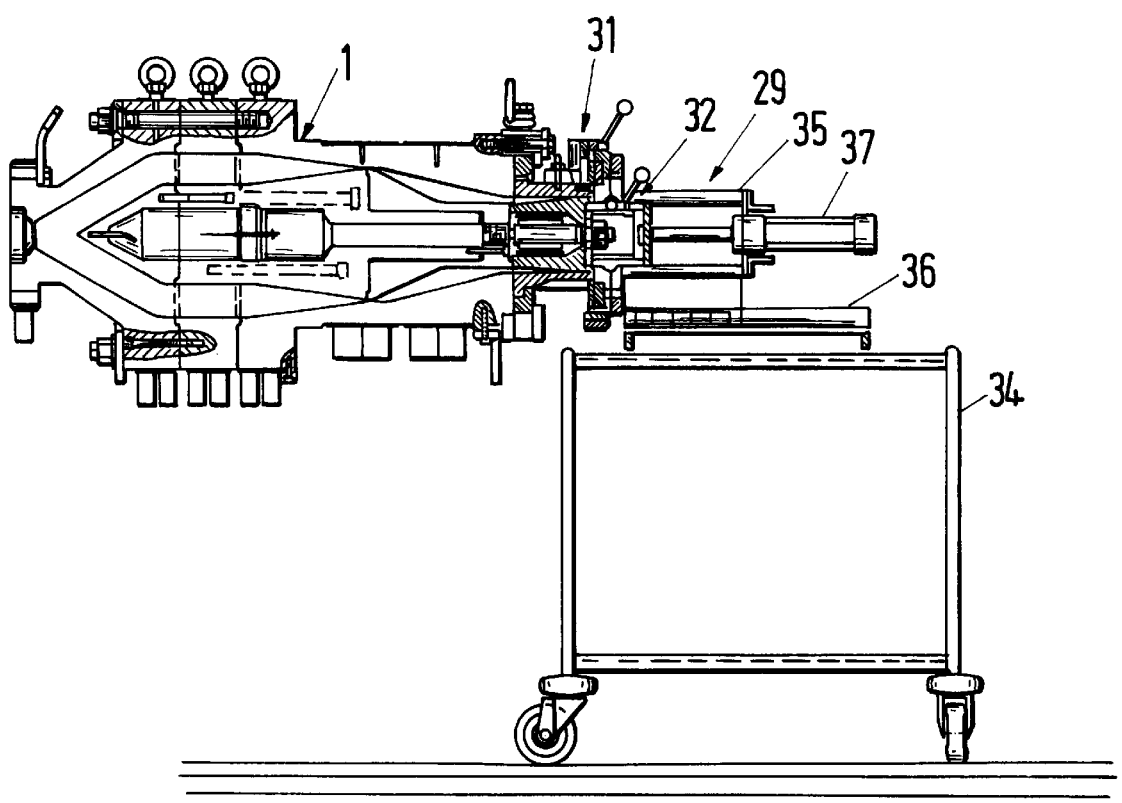

According to FIG. 1, the inventive extrusion head, which is shown only diagrammatically in FIG. 5 and labeled 1 as a whole, comprises a die head 2 which, in the extrusion direction 4, is disposed axially after a jaw plate 3 and, in detail, is formed by an outer cone 5 and an inner cone 6. The outer cone 5 and the inner cone 6 together form the outside and the inside respectively of a manifold 7, through which the plastic resin composition, which is to be extruded is pressed, before it emerges from the manifold 7 in the form of a cylindrical pipe at 8, for example.

The die head 2 is divided in the radial direction into a main part 9 and an orifice part 10. In the example shown, the main part 9, in turn, is divided in the radial direction into a basic part 11, adjacent to the jaw plate 3, and an intermediate part 12, which is placed between the basic part 11 and the orifice part 10.

The outer cone 5a of the orifice part 10 is fixed separately at the outer cone 5b of the intermediate part 12, by means of a bayonet-like quick release fitting 13 in the example shown. The quick release fitting 13 comprises a sealing and clamping ring 15, which can be secured in position at the outer cone 5b of the intermediate part 12 by connecting screws 14 and, at the outer cone 5a of the orifice part 10, forms a clamping gap 17, which is bounded at the front by the sealing projections 16 and can be changed by the connecting screws 14 and is intended to accommodate the locking projections 18, which are coordinated with the sealing projections 16. The clamping gap 17 has a diameter, which slightly exceeds the diameter of the circle circumscribing the locking projections 18 at the outer cone 5a of the orifice part 10, so that the outer cone 5a is accommodated in the clamping gap 17 so that it can be adjusted radially to a limited extent. Its precise radial position is specified with the help of adjusting screws 19, which pass radially through the sealing and clamping ring 15 and engage the annular clamping gap with the end of their threaded bolt. By loosening the connecting screws 14 and rotating the outer cone 5a of the orifice part 10 relative to the sealing and clamping ring 15, until the locking projections 18 are aligned with the gaps between the sealing projections 16, the outer cone 5a of the orifice part 10 can be released quickly and simply for removal. In the same manner, a different outer cone 5a with different dimensions, a different shape, other fittings and/or of different materials can be put in place rapidly and simply for a different product and locked by rotating and secured by tightening the connecting screws.

In the embodiment of FIG. 1, the inner cone 6a of the orifice part 10 is seated, in the operating position shown, directly on a central guiding part 20 and is secured in position at the adjacent inner cone 6b by means of a central cap screw 21, which can be screwed down on the guiding part 20. The guiding part 20 is formed by a central spindle, which has an internal thread at the orifice end and can be screwed by means of an external thread into the inner cone 6b of the intermediate part 12 and extends approximately over half the length of the inner cone 6a of the orifice part 10. To remove the inner cone 6a of the orifice part 10, it is merely necessary to loosen the cap screw 21, whereupon the outer cone 6a can be pulled off quickly and easily in the axial direction and replaced by a different one.

Figure 3:
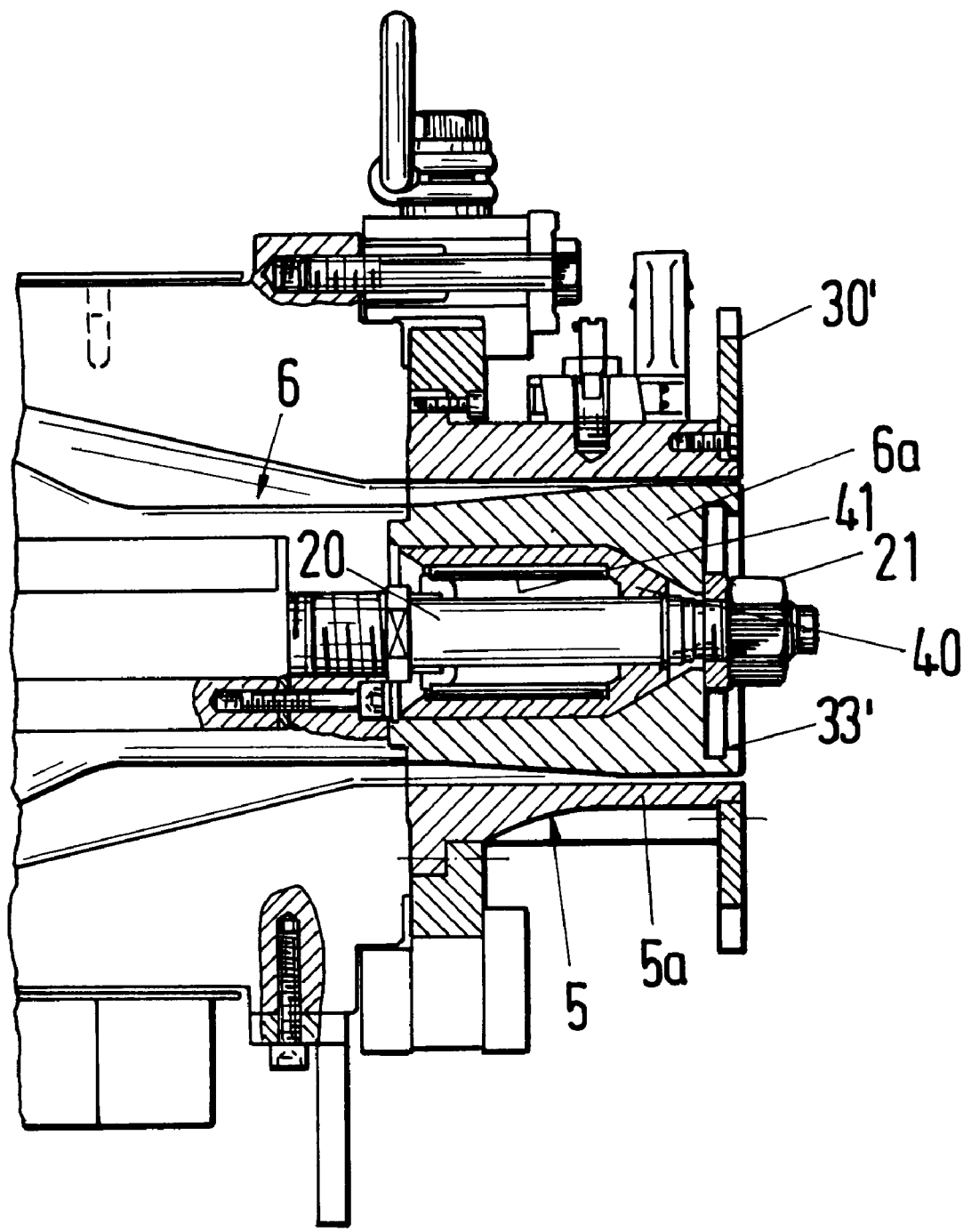
Figure 4:
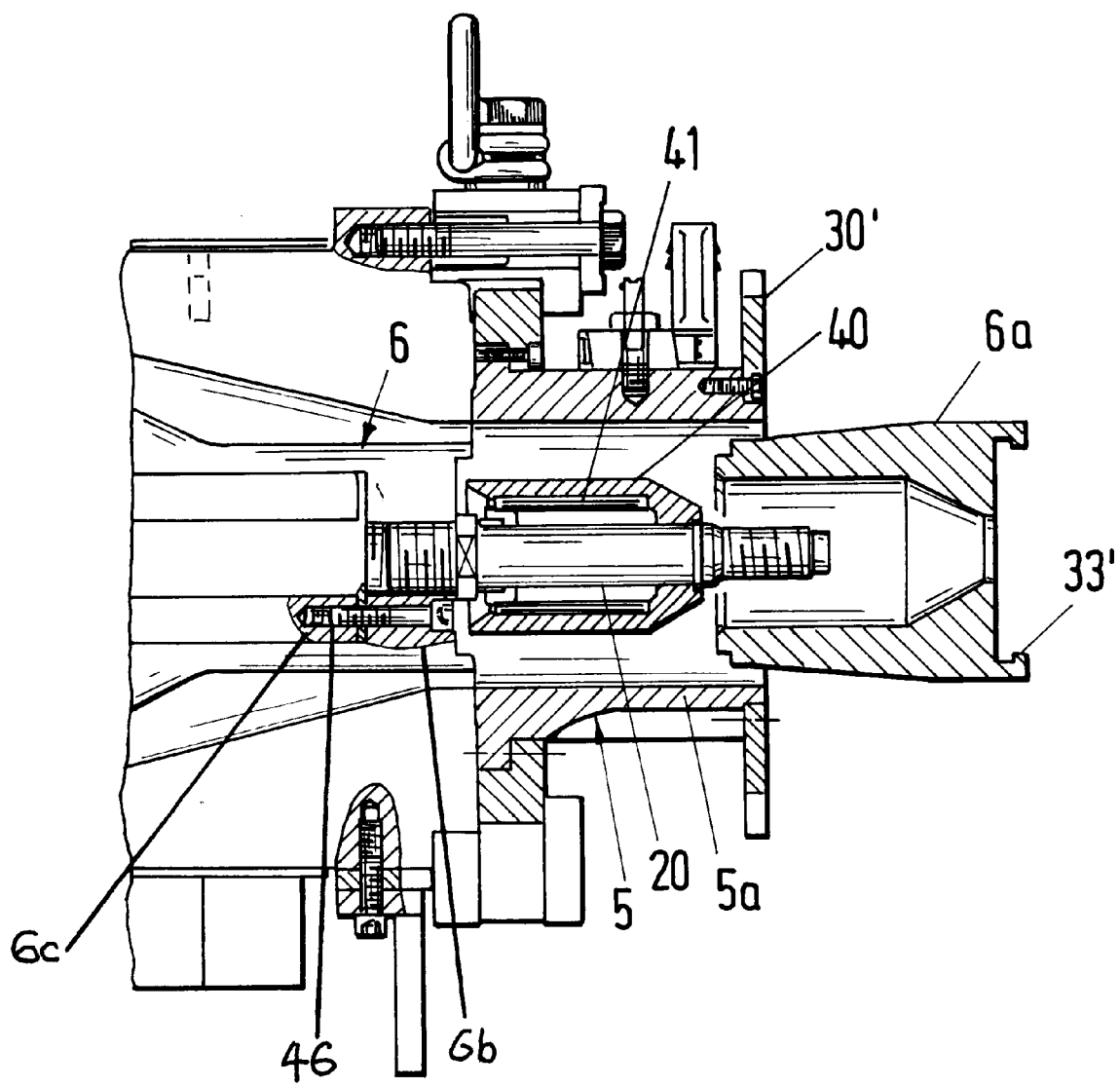

For the design of the extrusion head of FIGS. 3 and 4, the attachment 40 is disposed on the guiding part 20. In the interior, the attachment 40 is provided with electrical heating elements 41, with which the inner cone 6a of the orifice part 10 can be heated. Guided by the outside of the sleeve-shaped attachment 40, the inner cone 6a can be placed on the orifice part 10. Such a construction has the advantage that electrical connections to the heating element 41, which are a component of the guiding part, do not have to be disconnected when the inner cone 6a is exchanged.

By fixing the cones 5a, 6a of the orifice part 10 to the cones 5b, 6b, adjacent to it, of the intermediate part 12 in the manner described above, it is possible, in a rapid and simple manner, to retool or set up the die head 2 for a different product. For this purpose, for example, the inner cone 6a of the orifice part 10 can be exchanged by itself in order, for example, to produce a pipe or similar extrudate having the same external dimensions but a smaller or larger wall thickness. By exchanging only the outer cone 5a of the orifice part, a pipe or the like can be produced with larger external dimensions and a larger wall thickness. On the other hand, by exchanging both cones 5a, 6a of the orifice part, extrudates with external dimensions, varying within a certain range, and internal dimensions, selected for the external dimensions, can be produced. The weight of the cones 5a, 6a of the orifice part 10 is relatively low, being of the order of about 5% or less of the weight of the die head, which otherwise is usually exchanged, so that only slight energy losses are associated with the exchanging process. The relatively small and lightweight parts can easily be magazined in a space-saving manner and cleaned quickly and readily and prepared for later re-use. One or both cones of the orifice part 10 can be exchanged within a few minutes, so that the exchanging process can be carried out without the use of a special plastics composition, which previously was unavoidable for implementing exchanging processes. As a result of the rapid exchanging process, the production of the new product of different dimensions can be commenced with the plastic material already used previously for extrusion processes and present in the extruder. As a result, the productivity of the plastics extruder is improved appreciably.

The division of the main part 9 of the die head 2 into a basic part 11 and an intermediate part 12 expands the spectrum of the possible dimensional changes due to the possibility of being able to undertake exchanging processes, which include the cones 5b and 6b of the intermediate part 12, in addition to the exchanging process involving the orifice part. If there is a need for it, a further range of dimensions can be covered by radially dividing the die head 2 twice, since different combinations of the cones of the intermediate part 12 can be assigned in each case to different cone combinations of the orifice part 10. A threaded connection may be provided between the inner cones 6b and 6c at the location 44 shown in FIG. 1. Also the inner cone 6b may be removably attached to the inner cone 6c by the threaded member 46 shown in FIG. 4. If such a broad spectrum of dimensional changes is not required, one division of the die head 2 into a main part 9 and an orifice part 10 is sufficient.

In the case of the examples shown, the outer cone 5b of the intermediate part 12 and the outer cone 5c of the basic part 11 are connected together by a clamping ring 22, which embraces adjacent conical clamping flanges 23, 24 at the outer cones 5b and 5c of the die head parts 11, 12 and advisably is formed by two half parts 25, 26, which can be connected at one end by a clamping screw 27, which is illustrated only by its axial line, and are connected at their opposite end by a joint (not shown), which permits unfolding in the radial direction when the clamping screw 27 is loosened. By opening the clamping ring, the die head parts 10 and 12 can be removed together rapidly and simply from the die head part 11 and replaced by other die head parts of different dimensions. This procedure can also be carried out within minutes. For this purpose, a connecting sleeve 28, assigned to the sealing and clamping ring 15, enables load-lifting means to be connected and to facilitate the process of removing the die head parts 10, 12 jointly.

Instead of the clamping ring connection, the outer cones 5b and 5c can also be connected by bayonet-like quick release fittings. Preferably, the construction of this fitting is similar to that, which connects the outer cones 5a and 5b. Finally, the outer cones 5a and 5b or 5b and 5c can also be connected together by permanent magnets, which can be magnetized and demagnetized by electrical pulses.

The inner and outer cones 5a, 6a of the orifice part 10 are advisably each provided with suitable coupling means for connection to a supporting or gripping part of accessory equipment for exchanging, which is labeled 29 as a whole in FIG. 3. As coupling agent at the outer cone 5a of the orifice part 10, a number of countersunk boreholes 30, distributed over the periphery, or a connection plate 30, the edge of which is provided with recesses may, for example, be provided. The boreholes or recesses can be engaged by appropriate elements of a supporting or gripping part 31, which is provided in the accessory equipment for exchanging 29 for handling the outer cone 5a of the orifice part 10. As coupling agent for a supporting or gripping part 32 of the accessory equipment 29 for exchanging, intended for handling the inner cone 6a of the orifice part, the inner cone 6a can be provided with undercut coupling openings 33, which are accessible from the front, or also with a ring shoulder 33', which can be gripped from behind and protrudes over the front side of the inner cone 6a, so that the inner cone 6a, as well as the outer cone 5a of the orifice part 10, can be handled fully mechanically with the help of the accessory equipment 29 for exchanging. The two operations can be carried out individually as well as together. In the case of the example shown, the accessory equipment 29 for exchanging is supported on a movable carriage 34 and comprises the guides 35, 36 for moving the parts 31, 32 parallel to the central axis of the extrusion head 1. The shifting motions can be facilitated by a pressure medium driving mechanism. This is advantageous particularly when, after the clamping ring 22 is loosened, the two die head parts 10, 11 are to be removed together and replaced by exchange parts.

We claim:

1. An extrusion head for plastics extruders comprising a die head having a longitudinal axis, said die head having a longitudinal main part and a longitudinal orifice part, each of said parts having an inner cone and an outer cone, a first connector connecting said outer cone of said orifice part to said outer cone of said main part, a second connector connecting said inner cone of said orifice part to said inner cone of said main part independently of said first connection such that said outer and inner cones of said orifice part are replaceable on the respective outer and inner cones of the main part independently of one another, said main part including a base part and an intermediate part, said intermediate part being disposed between said base part and said orifice part, said outer cone of said main part including an outer cone section on said base part and an outer cone section on said intermediate part, said inner cone of said main part including an inner cone section on said base part and an inner cone section on said intermediate part, and third connector means connecting said outer cone section of said intermediate part to said outer cone section of said base part such that said outer cone section of said intermediate part is replaceable on the outer cone section of the base part.

2. An extrusion head according to claim 1 wherein said inner cone of said orifice part, said inner cone section of said intermediate part and said inner cone section of said base part have concentric projections to effect axial alignment thereof.

3. An extrusion head according to claim 1 wherein said second connector includes a central screw connection having a central longitudinal axis for connecting said inner cone of said orifice part and said inner cone section of said intermediate part in axial alignment.

4. An extrusion head according to claim 1 wherein said second connector includes a central guiding part and a central cap screw threaded to said guiding part.

5. An extrusion head according to claim 4 wherein said guiding part comprises a central spindle having an orifice end and inner thread on said orifice end and said spindle having an outer thread threaded to said intermediate part.

6. An extrusion head according to claim 4 further comprising an attachment on the inner cone of said orifice part and an internal heater on said attachment disposed between said attachment and said guiding part.

7. An extrusion head according to claim 1 further comprising an adjustment means operably disposed between said outer cone of said orifice part and said outer cone of said intermediate part for effecting radially relative movement between said outer cone of said orifice part and said outer cone of said intermediate part.

8. An extrusion head according to claim 1 wherein said first connector comprises a bayonet connector.

9. An extrusion head according to claim 8 wherein said bayonet connector includes a clamping ring, threaded fasteners fastening said clamping ring to said intermediate part, said clamping ring having first locking projections, a clamping gap between said first locking projections and said main part, second locking projections on said orifice part, said second projections being receivable in said clamping gap, said clamping gap having an outer diameter greater than the outer diameter of said second projections on said orifice part to provide for relative radial movement between said outer cone of said orifice part and said outer cone of said intermediate part by loosening said threaded fasteners.

10. An extrusion head according to claim 1 further comprising a radially disposed threaded adjusting device mounted on said main part and operable to engage said main part to effect radial relative movement between said main part and sad orifice part when said threaded adjusting device is rotated.

11. An extrusion head according to claim 1 wherein said third connector is operable to be connected and disconnected independently of said first connector and independently of said second connector such that said outer cone section of said intermediate part is replaceable on said outer cone section of said base part independently of said first and second connections.

12. An extrusion head according to claim 1 further comprising a fourth connector connecting said inner cone of said intermediate part to said inner cone of said base part independently of said third connector such that said inner and outer cones of said intermediate part are replaceable on said base part independently of one another.

13. An extrusion head according to claim 1 wherein said third connector includes a clamping ring which embraces clamping flanges on said base part and on said intermediate part.

14. An extrusion head according to claim 11 wherein said third connector comprises a bayonet connector.

15. An extrusion head according to claim 1 wherein said first connector comprises electromagnetic means.

16. An extrusion head according to claim 1 wherein said third connector comprises electromagnetic means.

17. An extrusion head according to claim 1 further including coupling means on said inner cone of said orifice part and on said outer cone of said orifice part, said coupling means being adapted to be engaged by an auxiliary changing device for removing, connecting and/or transferring said inner and outer cones of said orifice part either separately or jointly.

18. Extrusion apparatus for plastics extruders comprising a jaw plate, a die head on said jaw plate, said die head having a longitudinal axis, said die head including a base part, an intermediate part and an orifice part, said intermediate part being disposed between said base part and said orifice part, said base part being disposed between said intermediate part and said jaw plate, each of said parts having an inner cone and an outer cone, a first connector connecting said outer cone of said orifice part to said outer cone of said intermediate part, a second connector connecting said inner cone of said orifice part to said inner cone of said intermediate part independently of said first connection such that said inner and outer cones of said orifice part are replaceable on said intermediate part independently of one another, a third connector connecting said outer cone of said intermediate part to said outer cone of said base part, and a fourth connector connecting said inner cone of said intermediate part to said inner cone of said base part independently of said third connector such that said inner and outer cones of said intermediate part are replaceable on said base part independently of one another.

19. Extrusion apparatus comprising a jaw plate and a die head on said jaw plate, said die head having a longitudinal axis, said die head having an orifice part, an intermediate part and a base part, said orifice part being disposed between said base part and said orifice part, said base part being disposed between said intermediate part and said jaw plate, each of said parts having an inner cone and an outer cone, a first connector connecting said outer cone of said orifice part to said outer cone of said intermediate part, a second connector connecting said inner cone of said orifice part to said inner cone of said intermediate part independently of said first connection such that said inner and outer cones of said orifice part are replaceable on said intermediate part independently of one another, a third connector connecting said outer cone of said intermediate part to said outer cone of said base part such that said inner and outer cones of said intermediate part are replaceable on said base part, coupling means on said inner cone of said orifice part and on said outer cone of said orifice part, and an auxiliary changing device engageable with said coupling means for removing, connecting and/or transferring said inner and outer cones of said orifice part either separately or jointly.

20. Extrusion apparatus according to claim 19 wherein said auxiliary changing device includes a structure and means enabling said structure to be displaced in the longitudinal and/or transverse director.

21. Extrusion apparatus according to claim 1 wherein said auxiliary exchange device includes a carriage, exchange means on said carriage, and guide means supporting said exchange means on said carriage.

* * * * *